Aug. 1, 1939. P. J. BROOKS 2,167,936
PAPERBOARD BASKET
Filed Feb. 23, 1938 2 Sheets-Sheet 1
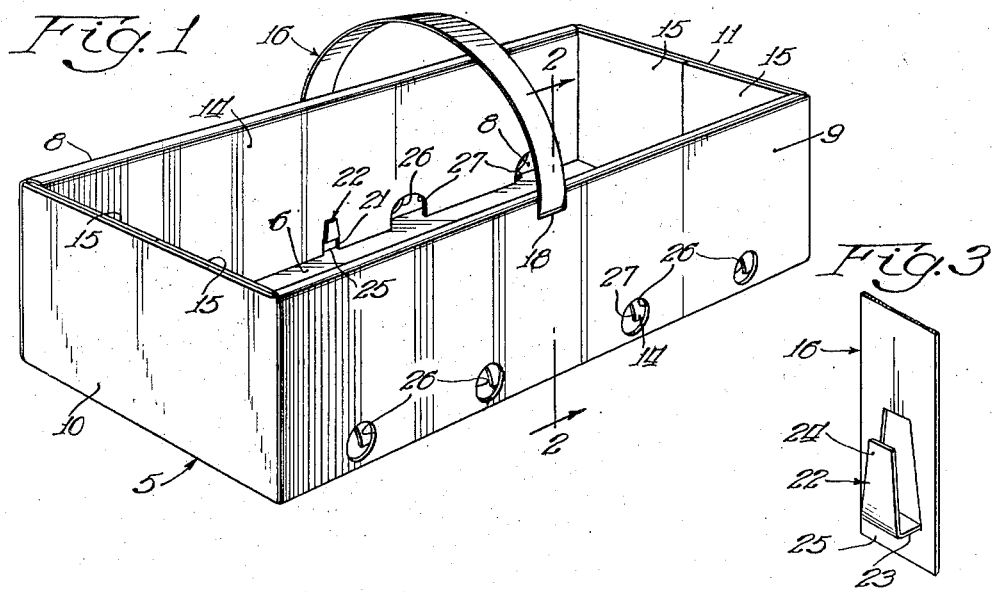
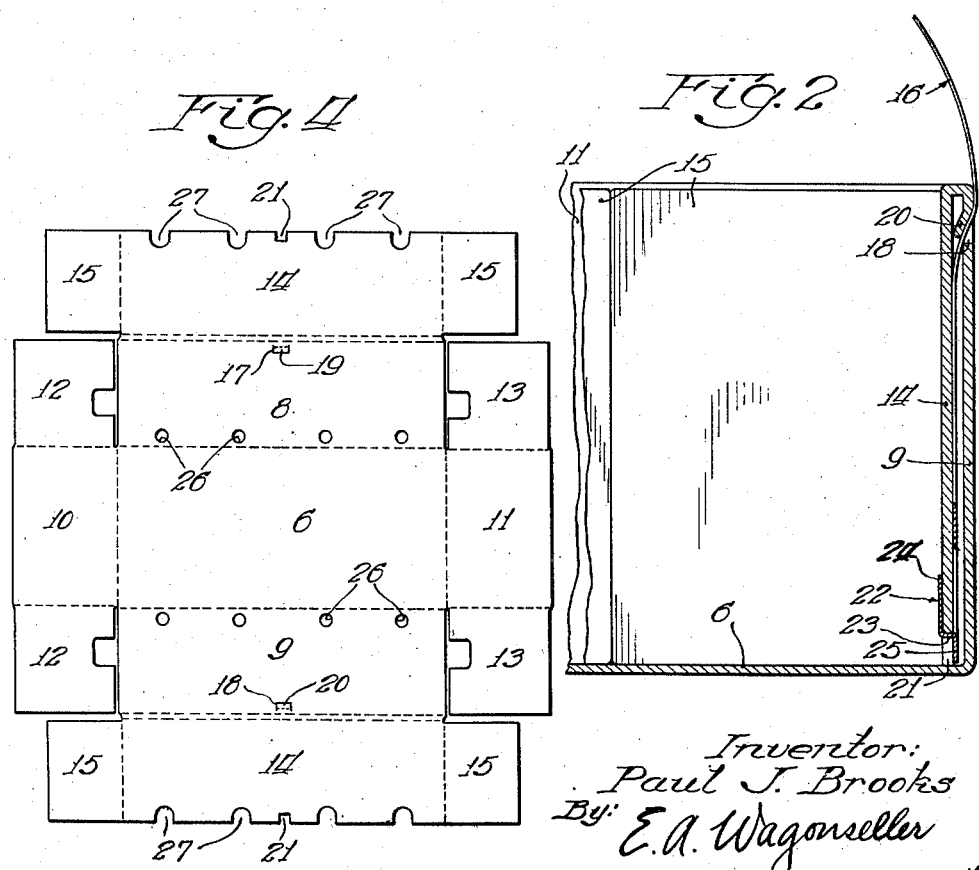
Inventor:
Paul J. Brooks
By: E. A. Wagonseller
Atty.

Aug. 1, 1939.   P. J. BROOKS   2,167,936
PAPERBOARD BASKET
Filed Feb. 23, 1938   2 Sheets-Sheet 2
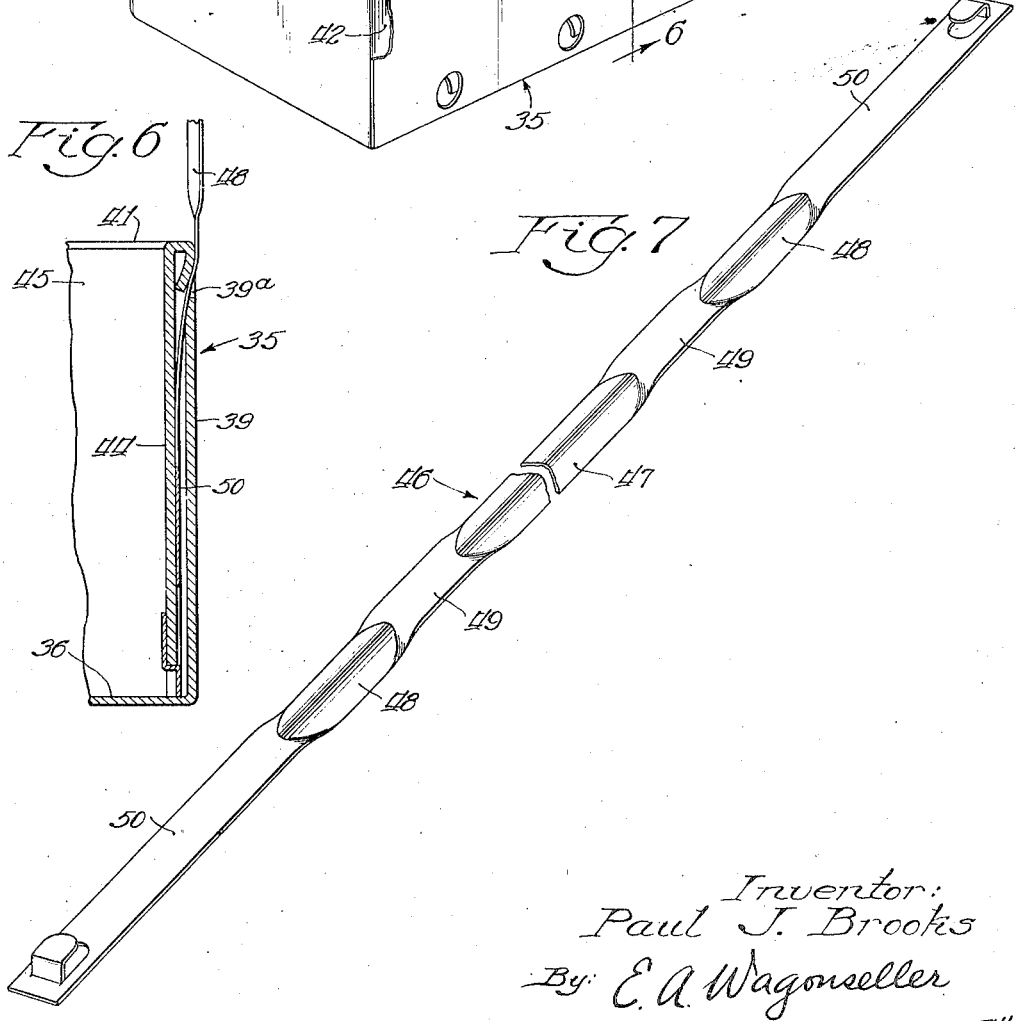
Inventor:
Paul J. Brooks
By E. A. Wagonseller
Atty.

Patented Aug. 1, 1939

2,167,936

UNITED STATES PATENT OFFICE 2,167,936

PAPERBOARD BASKET

Paul J. Brooks, Lakewood, Ohio, assignor to The Hankins Container Company, Cleveland, Ohio, a corporation of Ohio Application February 23, 1938, Serial No. 192,019

8 Claims. (Cl. 229—34)

The present invention relates to baskets and more particularly to paperboard baskets designed for packing and shipping fruits and vegetables.

Among the objects of the invention are to provide a paperboard basket having a separate handle element, the basket and the handle being designed for rapid assembly, whereby the basket may be set up and the handle assembled therewith in such a manner that the handle is firmly attached to the basket and, at the same time, the basket is maintained by such handle in its set-up position.

Another object of the invention is to provide an effective form of handle for a paperboard basket, whereby attachment of the handle to the basket is sufficient to cause the basket to be retained in its set-up position without the use of any additional securing elements.

A further object of the invention is to provide a convenient form of basket for receiving fruits and vegetables provided with effective ventilating openings in the side walls of the basket whereby adequate ventilation of the contents of the baskets will be assured.

Other objects of the invention will become apparent as the description proceeds and the novel features of the invention will be pointed out in the claims at the end of the specification.

In the drawings

Fig. 1 is a perspective view of a basket made in accordance with a preferred embodiment of the invention;

Fig. 2 is a fragmentary cross-sectional detail view taken on line 2—2 of Fig. 1, and illustrating the manner of assembly of the handle element with the side wall portions of the basket;

Fig. 3 is a fragmentary detailed perspective view of the lower end of one side of the handle element;

Fig. 4 is a plan view of the blank from which the basket may be formed;

Fig. 5 is a perspective view of a modified form of basket provided with a different form of handle element;

Fig. 6 is a cross-sectional view illustrating the manner of attachment between one leg of the handle and the basket; and Fig. 7 is a perspective view of the handle in straight form prior to bending same preparatory to engaging the ends with the side walls of a basket.

Similar reference characters throughout the several views indicate the same parts.

The basket of the present invention is formed from any suitable type of foldable paperboard, such as corrugated or solid fibre board, and the basket body is preferably, although not necessarily, formed of a single blank of paperboard, suitably cut and scored to provide a bottom, side walls, and end walls, and including suitable means for retaining the side and end walls in vertical position. A handle element is also provided which may be readily assembled with the basket body and which requires no expensive machinery for assembly, the manner of assembly of the handle with the basket body being such that there is provided a relatively smooth interior surface on which there are no rough edges which will in any way endanger the fruit or vegetables packed within the basket.

Referring particularly to Figures 1 to 4, inclusive, of the drawings, the basket body is designated as a whole at 5, and comprises a bottom wall 6, side walls 8 and 9, and end walls 10 and 11, all of which side and end walls are, in the present instance, integrally connected to the edges of the bottom and are defined therefrom by score lines, as indicated.

For the purpose of providing means by which the side and end walls may be maintained in vertical position flaps 12, 12 are preferably provided on end wall 10, and flaps 13, 13 on end wall 11, which, in the set-up condition of the basket, are folded inwardly to lie against the inner faces of the respective side walls 8 and 9. The end wall flaps 12, 12 and 13, 13 are held in place by side wall flap extensions 14, 14 which are arranged to be folded down on the inside of the basket so as to lie against the flaps 12 and 13 at each side thereof and thus maintain the side and end walls secured together at the corners of the basket. In this position the lower end of the inturned side wall flap extensions 14 will extend substantially to the bottom wall 6 of the basket and each will thus constitute a part of the side walls. The side wall flap extensions 14, 14 are preferably provided with flaps 15, 15 on their ends which are adapted to be folded inwardly to lie against the inner faces of the respective end walls 10 and 11 in the set-up position of the basket. It is to be noted that when the basket is in set-up position the flaps 15, 15 will abut each other along their inner edges and when so disposed will cause the side wall flap extensions 14, 14 to remain in position along the respective sides 8 and 9 of the basket. The natural resiliency of paperboard preferably used is such as to cause the flaps 15, 15 to be tensioned against the ends of the basket, thus retaining them in edge-to-edge abutting relationship whereby there is no tendency for the side walls to swing inwardly unless the flaps 15, 15 are disengaged from each other.

The handle element of the basket, indicated as a whole at 16, is in the form of a thin, flexible strip of material, preferably a strip of sheet metal. The handle and the basket body are so related as to permit the handle element to extend down between the inner and outer side wall elements provided by the side walls 8 and 9 and side wall flap extension flaps 14, 14, whereby the major portion of the ends of the handle will be shielded from direct contact with the contents of the basket. For this purpose the upper part of the side walls 8 and 9 are provided adjacent their top edges with openings 17 and 18, in the present instance illustrated as being formed by cutting out small flaps or tongues 19 and 20 to provide openings in the outer faces of the side walls at points spaced somewhat below the upper edges of the side walls.

Means are preferably provided for retaining the handle elements engaged with the body and also maintaining the lower ends from longitudinal shifting movement with respect to the basket body. For this purpose the outer edge portions of the side wall flap extensions 14, 14 are preferably formed with centrally arranged openings or notches 21, 21 for the purpose of receiving portions of the ends of the handle element 16 and preventing longitudinal shifting thereof.

As illustrated in Fig. 3, each end of the handle element is preferably formed with a cut-out tongue portion 22, which in the present instance is bent to form a horizontal section 23 and a vertical section 24. With the flap extensions 14, 14 in down-folded position, the distance from the bottom of the basket body to the upper edges of the openings or notches 21, 21 is preferably such as to be substantially equal to the distance from the horizontal section 23 of the handle element to the lower end of the handle designated at 25. See Fig. 2. In this position the tongue 22 will be engaged in the notch 21 and the lower end of the handle will be contacting the bottom of the basket. Due to this construction it is apparent that the lower ends of the handle 16 will be held from both upward and downward movement so long as tongue 22 is engaged with the flap extension 14 in its downfolded position.

It is to be noted that when the handle element is formed from relatively stiff sheet material, such as sheet metal, and the lower ends of the handle elements are engaged with the lower edges of the flap extensions 14, 14, the lower ends of the handle element will tend to assist in retaining the flap extensions in position along the side walls 8 and 9. This tendency of the handle element to retain the flaps 14, 14 in position is independent of the retaining function of flaps 15, 15, as above stated, and the handle will tend to retain the flaps 14, 14 in position even though the flaps 15, 15 are disengaged from each other, or in the case where these flaps 15, 15 are not used in forming the basket body.

Ventilating openings 26, 26 are preferably formed in the walls 8 and 9 adjacent their lower edges. In order to prevent these openings from being closed by the flap extensions 14, 14, there are preferably formed in the outer edge portions of the flaps 14, 14, as shown in Fig. 4, a series of openings 27, 27 which are arranged to come into registration with the openings 26, 26, as best indicated in Fig. 1.

The flaps 12, 12 and 13, 13 are likewise formed with openings 28, 28 adapted to register with the openings 26 in the ends of the walls 8 and 9 as well as with the openings 27 in the edge portions of the flap extensions 14, 14.

When the baskets of the present invention are delivered to the user the basket blanks are preferably in flat condition and the handle elements are preferably in the form of straight strips except that the tongue elements 22, 22 may be preformed, as illustrated in Fig. 3. In order to set up the basket the user may conveniently follow the following procedure. The end walls 10 and 11 are raised to vertical position after which the end wall flaps 12, 12 and 13, 13 are folded inwardly to lie substantially along the line of division between the side walls 8 and 9 and the bottom 6. Side walls 8 and 9 may then be elevated to lie against the outer surfaces of the respective flaps 12 and 13, after which the side wall flap extensions 14, 14 are folded downwardly to engage over the flaps 12 and 13. Before the flap extensions 14, 14 are folded entirely down to their final position along the walls 8 and 9 the ends of the handle element are inserted into the respective openings 17 and 18, then moved downwardly until the tongue element at the lower end of the handle can be engaged within the openings or notches 21 in the lower edge portions of the flap extensions. The tongue elements after being brought into engaging relation with the flaps at the openings or notches 21 are then preferably pressed against the surface of flap extension 14 to make the lower end of the handle cling relatively tightly thereto. This close fitting relationship between the tongue 22 and the flap prevents raw edges from being exposed which might injure the pieces of fruit or vegetables within the basket.

After the ends of the handle element have been engaged with the flap extensions 14 these extensions are forced outwardly to lie adjacent walls 8 and 9 in which position, as previously explained, the extremities of the flap extensions will lie against the inturned corner flap 12 and 13 and the flaps 15, 15 will assume an edge to edge abutting relationship.

After the basket has been set up, as described above, with the handle element engaged therewith, the basket is then ready to receive the contents. When the basket is lifted by the handle the weight of the basket and contents will be imposed upon the handle and through the handle to the point of attachment of the side wall flap extension with the bottom portion of the handle, and, in turn, through the flap extension to the top edges of the side walls 8 and 9.

Due to the provisions of the openings 17 and 18 in the side walls 8 and 9, any tendency of the contents of the basket to cause an outward flexing of the side walls will be overcome by the natural tendency of the handle sections adjacent the top edges of the side walls to pull such side walls inwardly under influence of the weight in the filled basket. In addition to the means for maintaining the side wall flap extensions against the side walls it is to be noted that the articles contained in the basket will also tend to maintain these flap extensions against the side walls.

Referring now to the modified form of the invention illustrated in Figs. 5, 6, and 7, the basket body, indicated as a whole at 35, is provided with a bottom 36, side walls 38 and 39, end walls 40 and 41, end wall flaps 42, 43, inturned side wall flaps 44, 44 each of which carries at its end flaps 45, 45, all of these parts being substantially identical with similar parts in the form of invention first described. The side walls 38 and 39 are provided with openings, one of which is indicated at 39a for the reception of the ends of a handle element, these openings being formed in a manner similar to the openings 17 and 18 of the form of invention first described.

The handle 46, as illustrated in Fig. 7, preferably comprises a relatively straight strip of sheet material such as thin sheet metal, and has the ends thereof adapted for attachment with the side portions of the basket. The material of the handle strip 46 is preferably thin enough to allow it to be readily bent by hand but having sufficient body to give the strip some degree of resiliency.

The means for attachment of the ends of the strip to the sides of the basket may comprise the same construction as illustrated in the form of invention first described. The handle 46 is preferably formed with a stiffened central portion 47, comprising the upper or horizontal portion of the handle, and is preferably also formed with two additional stiffened portions 48, 48, separated from the central stiffened portion 47, and preferably disposed in those parts of the handle which normally are vertical in the completed condition of the basket.

In the present instance the stiffened portions of the handle strip are produced by suitably bending or distorting the edge portions of the strip transversely away from the longitudinal center of the strip. This causes the strip to assume a convex form in cross-section throughout the areas of the portions so treated. In the present instance the strip is bent to assume a downwardly convexed shape. It is clear that the areas so treated will be stiffened and will resist bending. The portions between the stiffened areas, however, will be readily bendable so that when the straight strip, as illustrated in Fig. 7, is taken up in the hands and bending force applied along the stiffened portions 48, 48, it is obvious that bending will take place in the unstiffened portions indicated at 49, 49, lying between the ends of the central portion 47 and the portions 48, 48.

After the handle, made in accordance with this form of invention, is bent into U-shape, it is then in condition to be engaged with the sides of the basket as in the first form of the invention.

As indicated in Fig. 5, the convexly bent portions of the handle are preferably disposed so that the convex side is directed toward the interior of the basket.

If desired by the user, the handle 46 may be so bent that the vertical portions, indicated generally at 50, 50, will not be brought into exact parallelism but will be somewhat outwardly divergent so that when these end portions of the handle are engaged with the inner side wall flaps of the basket, as indicated in Fig. 6, the vertical sections 50, 50 will be brought into parallelism due to their engagement between the side walls 38 and 39 and the flaps 44, 44, but any tendency of the flaps 44, 44 to move inwardly will be resisted by the outward tensioning of the vertical sections of the handle.

The form of handle illustrated in this embodiment of the invention is very convenient and comfortable to the hand of the person carrying the basket. This form of handle is also quite advantageous when the basket is to be used in collecting produce, such as tomatoes, from the fields due to the fact that the rear or concave face of the convexly bent portion of the handle permits the handle to be firmly grasped between the thumb and fingers, with the thumb placed on the concave side of the handle. Thus, grasping the handle firmly will prevent extreme tilting of the basket and will tend to avoid possible spilling of part of the contents even though the contents, during the filling of the basket, are so disposed as to be predominately at one end or the other thereof.

The convex shaped, vertical portions of the handle are also convenient in other methods of using the baskets. For example, the user, when preparing to fill the baskets in the field, may readily carry two baskets side by side in one hand by grasping the juxtaposed upwardly extending handle portions of adjacent baskets at the inwardly directed convex portions of the handles. These convex portions of the handles each form one section of a composite grasping element having a generally tubular form which is considerably thicker than the combined thickness of two flat strips of handle material. This enables the user to more firmly grasp the vertical parts of the handles than is the case when these portions are left in a flat condition, as illustrated in Fig. 1. The possibility of cutting the hands on the edges of the strips is also substantially eliminated.

While the present description sets forth certain preferred embodiments of the invention, numerous changes may be made in the construction without departing from the spirit of the invention, and it is therefore desired that the present embodiments be considered in all respects as illustrative and not restrictive, reference being had to the appended claims rather than to the foregoing description to indicate the scope of the invention.

I claim:

1. A paperboard basket comprising a bottom, side walls and end walls secured thereto, flap extensions on the upper edges of the side walls adapted to be folded downwardly to lie along the inner faces of the side walls so as to constitute a part thereof, a handle element for the basket comprising a strip of thin, flexible material, the side walls of the basket being each formed with an opening in their outer faces somewhat below the top edges thereof to receive the ends of the handle element, the ends of the handle element each having an inwardly projecting tongue for engagement with the lower portion of the inturned side wall flap extension, said flap extensions being formed with openings in vertical alignment with the openings in the outer faces of the side walls, whereby the sides of the openings in the flap extensions are adapted to engage against the edges of the tongue on the handle and maintain the lower end of the handle against longitudinal shifting movement.

2. A paperboard basket comprising a bottom, side walls and end walls secured thereto, flap extensions on the upper edges of the side walls adapted to be folded downwardly to lie along the inner faces of the side walls so as to constitute a part thereof, a handle element for the basket comprising a strip of thin material, the side walls of the basket being each formed with an opening adjacent the top edges thereof to receive the ends of the handle element, the ends of the handle element each being provided with a tongue member for engagement with the lower portion of the inturned side wall flap extensions, said flap extensions being formed with notches in their lower edges disposed in vertical alignment with the openings in the side walls, whereby the sides of the notches in the flap extensions are adapted to engage against the edges of the tongue member on the handle and maintain the lower end of the handle against longitudinal shifting movement.

3. A paperboard basket comprising a bottom, side and end walls, flap extensions integral with the upper edges of the side walls and arranged to be folded downwardly to lie along the inner faces of the side walls, a thin, flexible handle element for the basket, each side wall being formed with an opening adjacent the top edge thereof to receive the ends of the handle element, and means for engaging the lower ends of the handle element with the lower portion of the inturned side wall flap extensions after the ends of the handle element have been inserted in the openings in the side walls, such means also serving to retain the lower end portions of the handle element from shifting movement longitudinally of the basket.

4. A paperboard basket comprising a bottom, side walls and end walls secured thereto, flap extensions on the upper edges of the side walls and of substantially the same width as the side walls to provide side walls of at least double thickness throughout substantially their entire areas when the flap extensions are folded down against the side walls, the end walls having corner flaps thereon whereby the basket may be formed by folding the end walls upwardly, then folding the corner flaps thereon inwardly, and subsequently folding the side wall flap extensions thereover, means for retaining the side wall flap extensions in place along the inner faces of the side walls of the basket, the side walls of the basket being each formed with a series of ventilating openings adjacent the bottom edges thereof, the side wall flap extensions being each formed with a series of openings adjacent their outer free edges adapted to register with the openings in the side walls, and the end wall flaps being formed with openings adjacent their edges which, in the set-up form of the basket, are disposed along the lower edges of the side walls, such openings being in registration with certain of the registering openings of the side walls and side wall flap extensions.

5. A paperboard basket comprising a bottom, side walls and end walls secured thereto, flap extensions on the upper edges of the side walls and of substantially the same width as the side walls to provide side walls of at least double thickness throughout substantially their entire areas when the flap extensions are folded down against the side walls, means for retaining the side wall flap extensions in place along the inner faces of the side walls of the basket, the side walls of the basket being formed with a series of ventilating openings adjacent the bottom edge thereof, and the side wall flap extensions being each formed with a series of openings adjacent their outer free edges adapted to register with the openings in the side walls.

6. A blank for a paperboard basket comprising a sheet of foldable paperboard cut and scored to provide a bottom panel, side and end panels defined from the bottom panel by foldable lines, side wall extension flaps on the edges of the side walls remote from the bottom panel, each side wall being formed with a narrow handle-receiving opening adjacent the line of juncture of the side wall with the side wall extension flaps and disposed substantially centrally between the ends of the side wall, and the outer edge portion of each side wall flap extension being formed with a handle engaging opening in substantial alignment with the first-mentioned opening formed in the side walls.

7. A handle for a paperboard basket, said handle comprising a strip of sheet metal bent into U-shape, said strip having the central portion thereof bent transversely into downwardly directed convex shape to stiffen such portion and to facilitate the grasping thereof by the hand, said strip also including additional portions, one on each side of and spaced from the central stiffened portion, said additional portions being bent transversely into inwardly directed convex shape to stiffen such portions, the portions of the handle lying between the separated stiffened portions being readily bendable whereby, when the strip is bent into U-shape, the bending of the strip will be restricted to the areas between the stiffened portions, the ends of said strip being adapted for ready attachment to the side portions of a basket.

8. A paperboard basket comprising a bottom, end walls and side walls, a handle for the basket, said handle comprising a strip of flat sheet metal bent into U-shape and having its ends secured to the side walls of the basket, the portions of the handle extending upwardly from the side walls being formed of inwardly directed convex shape, whereby either one of such portions when placed in juxtaposition with a similarly formed vertical portion on the handle of an adjacent basket will provide one section of a grasping element of considerably greater thickness than the combined thickness of two flat strips to thus enable two adjacent baskets to be conveniently carried by one hand.

PAUL J. BROOKS.